United States Patent

[11] 3,532,033

[72] Inventor David C. Chang
 Pleasant Valley, New York
[21] Appl. No. 737,906
[22] Filed June 18, 1968
[45] Patented Oct. 6, 1970
[73] Assignee International Business Machines
 Corporation
 Armonk, New York
 a corporation of New York

[54] ELECTRO-OPTIC LIGHT BEAM CONTROL FOR DISPLAYING AND PRINTING
10 Claims, 7 Drawing Figs.

[52] U.S. Cl. .................................................. 95/4.5
[51] Int. Cl. .......................................... B41b 21/26
[50] Field of Search .......................................... 95/4.5;
 346/107; 350/150

[56] References Cited
UNITED STATES PATENTS
3,220,013 11/1965 Harris .................... 346/107

Primary Examiner—John M. Horan
Attorney—Hanifin and Jancin and Edward S. Gershuny ABSTRACT: Electro-optic means for controlling the deflection of a beam of light to effect the display or printing of information. A first deflector deflects a beam of light through a selected portion of a character mask to produce a character-shaped beam. A second deflector deflects the character-shaped beam to a selected location on a light sensitive medium. The deflection control means for the second deflector adds two signals together to produce a resultant signal indicative of the amount of deflection required of the second deflector to direct the character-shaped beam to the selected location on the light sensitive medium.

INVENTOR
DAVID C. CHANG

BY Edward S. ......

ATTORNEY

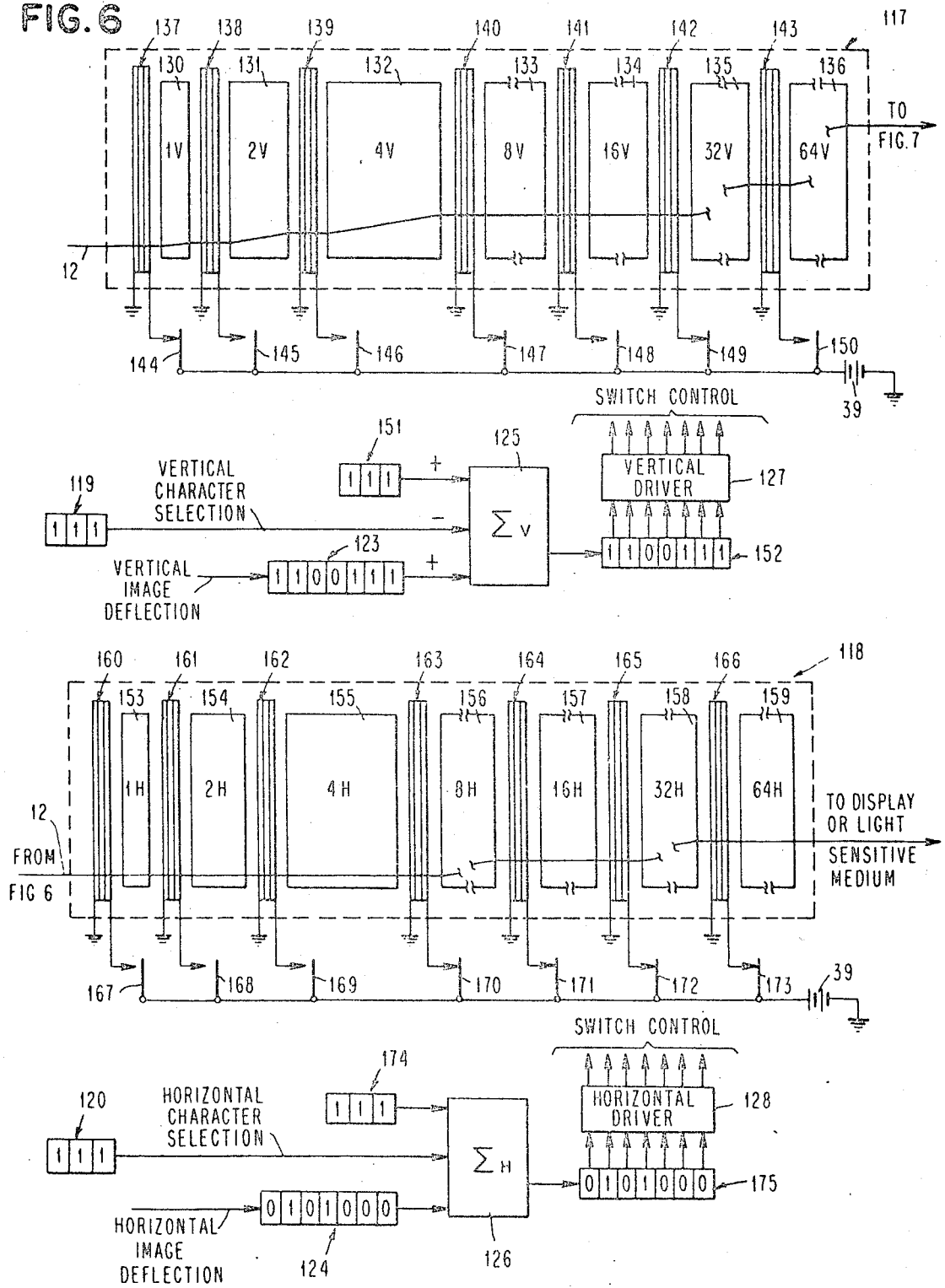

3,532,033

ELECTRO-OPTIC LIGHT BEAM CONTROL FOR DISPLAYING AND PRINTING

This invention relates to display and printing mechanisms, and more particularly to mechanisms employing a light beam and devices for controlling it to effect the display or printing of information at high speeds.

Reissue U.S. Pat. No. Re. 26,170 by Thomas J. Harris, reissued March 7, 1967, shows an apparatus which displays characters selectively on a display medium by means of light. A beam of light which has been collimated and polarized is deflected upon a character mask. The character mask is generally opaque but has transparent portions in the form of characters. The light passing through any character portion is then deflected to a common point, and is then deflected again to any selected location on a display or light sensitive medium.

It is well-known to those skilled in the art that the intensity of light will be diminished each time that it passes from one medium to another. This is because, at the boundary between two media, some of the light will generally be reflected back from the boundary instead of all of the light being passed through it. Also, the length of the path through which the light must travel will tend to affect its intensity.

An object of this invention is to provide an improved display or printing mechanism.

Another object is to provide an improved mechanism in which the light that impinges upon a display or light sensitive medium is of greater intensity.

Still another object is to accomplish the above in a manner that will generally be less expensive than prior art apparatus.

The foregoing and other objects are accomplished in accordance with one aspect of this invention by providing apparatus which utilizes only two deflector stages. The first deflector stage will deflect an incoming beam of light through the transparent portion of a character mask which represents a selected character. The second deflector stage will deflect the light which passes through the transparent character portion of the character mask directly onto any selected location on a display or light sensitive medium. The second deflection is accomplished by adding together two digital signals, one of which represents the location of the selected character on the character mask, and the other of which represents the selected location on the display or light sensitive medium. This invention requires adding means for its operation, while the prior art referred to above does not. However, it is well known that devices of this nature are often used as output devices for data processing machines, and therefore the necessary adding means will often already be available.

A significant feature of this invention is its elimination of one of the deflector stages used in the prior art described above. One of the advantages of this feature is that this invention will generally be less expensive to implement than the prior art. Another significant advantage is that the beam of light will traverse fewer boundaries in the path between its source and its destination. Also, the total length of the path traversed by the light will generally be decreased. For these reasons, the intensity of the light impinging upon the display or light sensitive medium will be greater than in the prior art.

The foregoing and other objects, features and advantages of the invention will be apparent from the following more particular description of preferred embodiments of the invention, as illustrated in the accompanying drawings.

In the drawings:

FIG. 6 is a side elevational view of the vertical deflection mechanism for the second deflector in FIG. 3, and also showing the manner in which two signals are added to produce a resultant deflection signal.

FIG. 7 is a plan view of the horizontal deflection mechanism for the second deflector of FIG. 3, and also showing the manner in which two horizontal deflection signals are added to produce the resultant horizontal deflection signal.

Figure 1:
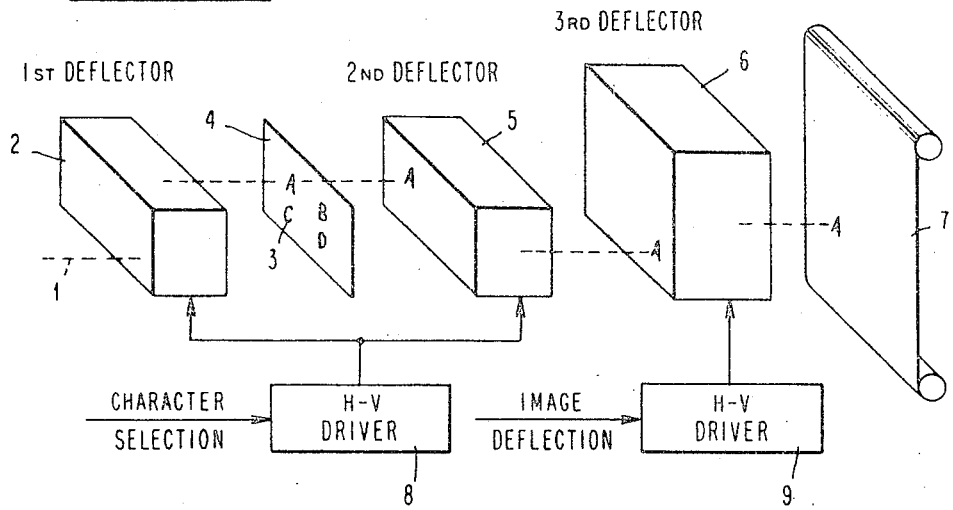
FIG. 1 is a schematic drawing of a prior art device.

Referring to FIG. 1, the prior art device described in U.S. Pat. No. Re. 26,170 is shown. A beam 1 of monochromatic, collimated, and linearly polarized light is supplied from any suitable source, not shown. The light beam 1 passes through a first deflector 2 which is operable to deflect the beam to a point in alignment with any character 3 on a character mask 4. This mask is generally opaque but its character portions are transparent so the beam may pass through such portion and assume the shape of the character. The character-shaped beam then passes through a second deflector 5 which is similar to the first deflector but neutralizes the deflection induced by the latter so the beam is returned to a path corresponding to that at which it was first received. A third deflector 6 receives the light beam from the second deflector and directs it to any selected point on the surface of a display or light sensitive member 7. Deflectors 2 and 5 utilize a common horizontal-vertical driver 8 in a manner described more fully in U.S. Pat. No. Re.26,170. Said reissue U.S. Pat. No. Re.26,170 is hereby incorporated herein by this reference. Another horizontal-vertical driver 9 controls the deflection effected by deflector 6.

Figure 2:
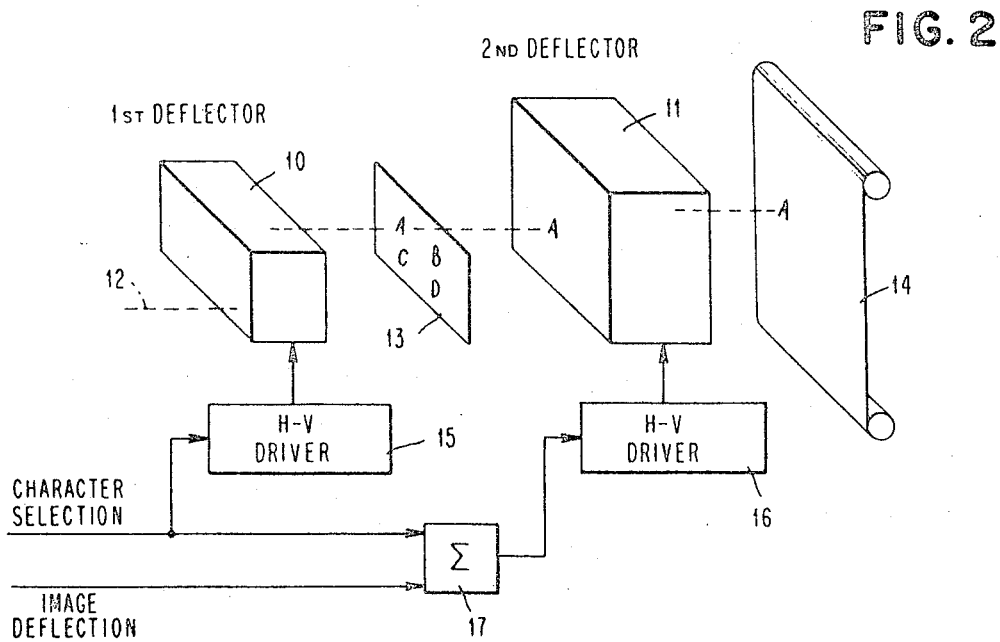
FIG. 2 is a schematic drawing of deflection apparatus incorporating this invention.

Referring to FIG. 2, wherein apparatus embodying this invention is shown, it will be seen that only two deflectors 10, 11 are used. The first deflector 10 deflects a beam 12 of monochromatic, collimated and linearly polarized light to a point in alignment with any character on a character mask 13. The light beam, which is of small cross-sectional area, may be supplied by a laser but could also be supplied by carbon or mercury arc lamps with appropriate filters, polarizers, and collimating means. The character-shaped beam then passes through the second deflector 11 by which it is directed to any selected point on the surface of a display or light sensitive medium 14. The amount of deflection effected by the first deflector 10 is controlled by a horizontal-vertical driver 15 in exactly the same manner as the prior art described above with respect to FIG. 1. The amount of deflection effected by the second deflector 11 is controlled by horizontal-vertical driver 16. Driver 16 receives its input from summing means 17 which combines a digital signal representing the location of the character that was selected on the mask 13 with a digital signal representing the selected location on the display or light sensitive medium 14. The summing means 17 will hereinafter be referred to as an adder. However, as will be described in more detail below, it must be recognized that the adder 17 may either perform addition or subtraction operations depending upon other parameters of the apparatus.

Figure 3:
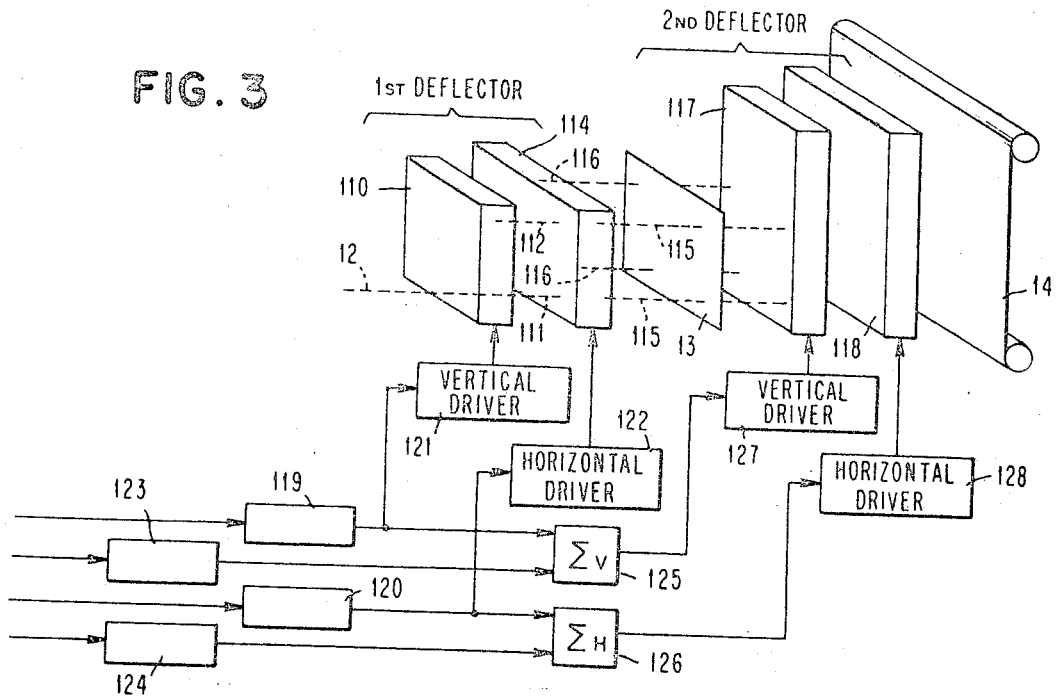
FIG. 3 is similar to FIG. 2 but shows two deflectors through which the light passes, each deflector having both means for deflecting the beam vertically to any one of a plurality of selected points, and means for deflecting it horizontally to any selected point.

As shown in FIG. 3, the first deflector comprises a unit 110 which operates to deflect the light beam 12 vertically to any one of several levels between the level 111 at which the beam is received and a higher level 112. It also includes a unit 114 which is operable either to pass a light beam from unit 110 without deflection or to deflect the beam horizontally to any one of several paths between zero-deflection paths 115 and maximum deflection paths 116. It will be seen that the number of paths over which the light beam may be directed to the mask 13 is equal to the product of the beam levels produced by unit 110 and the horizontal deflections produced by unit 114. The second deflector functions in a manner similar to the first. The character-shaped light beams from the mask 13 first pass through a vertical deflection unit 117 and then a horizontal deflection unit 118. Unit 117 can pass the light beam without deflection or it can deflect the light beam vertically upwards. Unit 118 also can pass the light beam without deflection, or it can deflect the light beam horizontally in a direction into the drawing. The beam leaving the unit 118 engages the medium 14 on which information is displayed or printed. In the preferred embodiment of this invention, character selection information will be stored in two registers 119 and 120. Register 119 will contain a representation of the amount of vertical deflection of the light beam 12 that is needed for the beam to pass through the selected character. Register 120 will contain a representation of the amount of horizontal deflection that is required of the light beam 12. The information contained in registers 119 and 120 will be utilized to control, respectively, vertical driver 121 and horizontal driver 122, so that the first deflector 110, 114 will properly deflect the incoming light beam 12 to the selected character on the mask 13. Registers 123 and 124 will contain, respectively, vertical deflection data and horizontal deflection data pertaining to a selected location on the display or light sensitive medium 14. In order to ensure that the beam of light leaving deflection unit 118 be deflected to the selected location on medium 14, the amount of deflection introduced by the first deflector 110, 114 must be taken into consideration. Vertical deflection introduced by deflection unit 110 is taken into consideration by adder 125 which combines the data contained in registers 119 and 123 to produce a resultant vertical deflection that is required of deflection unit 117 in order that the light beam will be at the proper vertical level when it impinges upon the medium 14. The output of adder 125 is fed to the input of vertical driver 127 which controls the amount of deflection introduced by deflection unit 117. Similarly, the horizontal deflection introduced by deflection unit 114 is taken into consideration by adder 126 which combines the horizontal character selection data in register 120 with the horizontal image deflection data in register 124 to produce a resultant output indicative of the amount of horizontal deflection that must be introduced by deflection unit 118. The output of adder 126 is fed to horizontal driver 128 which controls the amount of deflection introduced by deflection unit 118. The character selection and image deflection information which is fed into registers 119, 120, 123 and 124 may come from any suitable source, not shown. Examples of sources of this data would be a typewriter, a card or tape reader, a computer, etc. It will be recognized by those skilled in the art that registers 119, 120, 123 and 124 and adders 125 and 126 may already be present in the device which supplies data to the system shown in FIG. 3. This will generally be the case when the source of data is a computer or data processing machine. In such case, the pre-existing registers and adders in the data source may conveniently be utilized.

Figure 4:
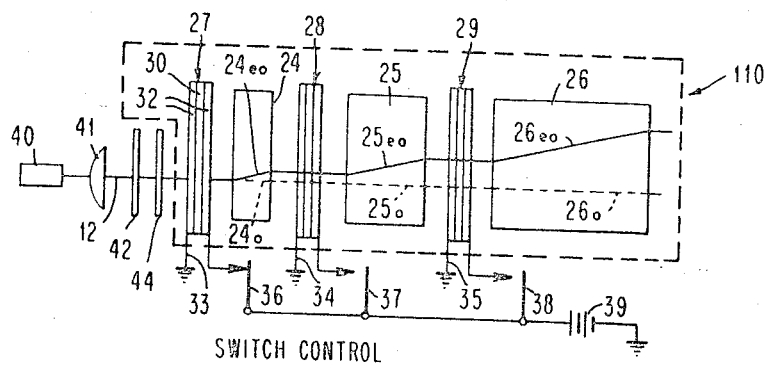
FIG. 4 is a side elevational view of the vertical deflection mechanism for the first deflector in FIG. 3, and the mechanism for delivering the light beam thereto.

The vertical deflection unit 110 comprises, as shown in FIG. 4, birefringent elements 24, 25 and 26 which may be crystals cut especially to allow incoming plane polarized light to pass through them in one path or another as either an ordinary ray or an extraordinary ray but not both simultaneously. The path followed depends upon the direction in which the beam entering the crystal is polarized. A beam plane polarized perpendicular to the plane of the drawing will pass, for example, through the crystal without deflection as the ordinary ray. If the light is polarized parallel to the plane of the drawing, it will be deflected and pass as the extraordinary ray over a different path. The spacing between the points at which the ordinary and extraordinary rays leave the crystal is directly proportional to the thickness of the crystal.

At the input sides of the birefringent elements 24, 25 and 26 are electro-optic devices 27, 28 and 29. Each of these devices is made up of an electro-optic crystal 30 between a pair of transparent electrodes 32. When a potential of sufficient magnitude is applied across any one of the electro-optic devices, a rotation of the plane of polarization of the light by 90° takes place. For applying such a potential selectively across these devices, one electrode of each device is connected to ground at points 33, 34 and 35, while the other electrodes are connected through switches 36, 37 and 38 to one side of a potential source 39 which is connected at its other side to ground. Mechanical switches are shown herein only to provide an understanding of the invention. In actual practice, electronic switching means responsive to coded electric pulses would be used. The coded electric pulses would be generated by the vertical driver 121 in response to data contained in the vertical character selection register 119. The potential at source 39 is of sufficient magnitude to effect a rotation of the plane of polarization of the light beam by 90° as it passes through one of the electro-optic devices having a potential applied across it by the closing of one of the switches.

The light beam 12 is supplied from a suitable source 40 through a lens 41 which causes it to be collimated. The collimated light then passes through a polarizing means 42 which effects a linear polarization of the beam in a plane perpendicular to the plane of the drawing. A portion of the monochromatic, collimated and linearly polarized beam is passed through a small opening in a plate 44 to the electro-optic device 27. If all of the switches 36, 37 and 38 were open, the light beam would pass through each of the birefringent elements 24, 25 and 26 without deflection as the ordinary ray 24o, 25o, and 26o. Maximum deflection is obtained when the switch 36 is closed to apply a potential across the electro-optic device 27 and the other switches are left open as shown in FIG. 4. The light beam has its plane of polarization rotated 90° by the device 27 and passes through the elements 24, 25 and 26 as the extraordinary ray along the paths 24eo, 25eo and 26eo. If the switch 37 had also been closed, the plane of polarization would have been rotated again 90° by the electro-optic device 28 to pass the ordinary ray through the elements 25 and 26 without deflection. The total displacement would then have been only that which took place in element 24. By closing the switches either singly or in combination it is possible to obtain deflections proportional to the thickness of any element or combination of elements. As shown in FIG. 4, the thickness of the elements 24, 25 and 26 increases by a factor of two. With this arrangement, the number of levels at which an output of light may be obtained is equal to two raised to a power equal to the number of elements. Since three elements have been shown, an output could be obtained at any one of eight levels.

Figure 5:
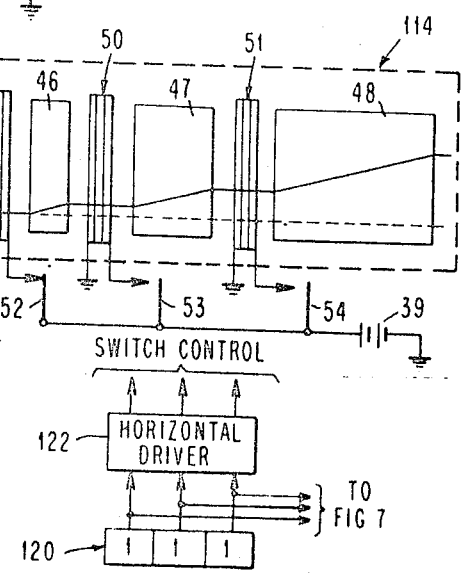
FIG. 5 is a plan view of the horizontal deflection mechanism for the first deflector of FIG. 3.

The horizontal deflection unit 114 of the first deflector is shown in plan view FIG. 5 so the different paths that the light may follow through this unit can be indicated. This unit includes birefringent elements 46, 47 and 48 like those in the vertical deflection unit but rotated 90° so the extraordinary rays are deflected inwardly as viewed in FIG. 3, while the ordinary rays continue to move in planes parallel to the plane of the drawing. At the input sides of the elements 46, 47 and 48 are electro-optic devices 49, 50 and 51 like the devices 27, 28 and 29 and adapted to have potentials applied across them by the closing of switches 52, 53 and 54. Again, it is to be noted that the mechanical switches shown herein would, in actual practice, be replaced by electronic switching means responsive, in any of a number of known manners, to electric pulses generated by the horizontal driver 122 in response to data contained in the horizontal character selection register 120. Since the birefringent elements 46, 47 and 48 are turned 90° relative to the elements 24, 25 and 26, light polarized in a plane to pass through the latter elements as an ordinary ray will pass through the elements 46, 47 and 48 as an extraordinary ray. Also light passing through the elements 24, 25 and 26 as the extraordinary ray will pass through the elements 46, 47 and 48 as the ordinary ray. Light deflected to its maximum vertical position in FIG. 4 by passing it through each of the elements as the extraordinary ray will pass through the elements 46, 47 and 48 without deflection if all of the switches 52, 53 and 54 are open. To obtain maximum horizontal deflection of this light in FIG. 5, switch 52 must be closed while switches 53 and 54 are left open. With the deflection units 110 and 114 of FIG. 3 constructed as shown in FIGS. 4 and 5, an output of light could be obtained from the unit 114 in any one of eight equally spaced vertical planes and at any one of eight points spaced vertically equal distances in each plane. There are, therefore, 64 different points through which light may be directed to the character mask 13. This number could be increased, if desired, by simply adding another birefringent element and electro-optic device to either one or both of the units 110 and 114.

After the light beam leaves the deflection unit 48, it passes through the vertical deflection unit 117 and the horizontal deflection unit 118 to the display or light sensitive medium 14 shown in FIG. 3. As is shown in more detail in FIGS. 6 and 7, the units 117 and 118 are like the units 110 and 114, respectively, except that each has more than the three birefringent elements and electro-optic devices shown for the units 110 and 114 in FIGS. 4 and 5. The number provided will depend upon the number of points at which it is desired to print characters both horizontally and vertically. If desired, only a horizontal deflection unit may be employed in place of the units 117 and 118 so that the characters will be printed on a single line. A mechanism would then be provided for advancing the medium 14 line by line as printing progressed.

Referring again to FIG. 3, assume that the light beam 12 enters the first deflection unit 110 at the lower right-hand corner thereof. After passing through deflection units 110 and 114, the light beam will have been deflected upwards $v$ increments and will have been deflected horizontally into the plane of the paper $h$ increments. The quantity $v$ is contained in register 119 and the quantity $h$ is contained in register 120. Also assume that it is desired that the beam of light which comes from deflection unit 118 should impinge upon the medium 14 at a location V increments from the bottom of medium 14, and H increments from the right-hand side of medium 14. Since the light beam which enters deflection unit 117 will have already been deflected $v$ increments in the vertical direction, deflection unit 117 must be caused to introduce an additional vertical deflection of (V-$v$) increments in order that the total vertical deflection of V increments may be achieved. Similarly, the horizontal deflection unit 118 must deflect a beam of light which enters it by an amount of equal to (H-$h$) increments in order that the total horizontal deflection of the light beam which impinges upon medium 14 will be the desired H increments. Thus, it will be seen that, in order to furnish proper data to vertical driver 127, the adder 125 must subtract the contents of register 119 from the contents of register 123 in order to produce the proper amount of additional deflection required by deflection unit 117. For the same reason, adder 126 must subtract the contents of register 120 from the contents of 124 in order to generate the proper amount of additional deflection required of deflection unit 118. In theory, the number of locations on medium 14 upon which a beam of light may be directed is equal to the product of the beam levels produced by unit 117 and the horizontal deflections produced by unit 118. However, it would generally not be practical to attempt to utilize the full theoretical capability. Once the beam of light has been deflected upward by deflection unit 110, the system shown in FIG. 3 is incapable of returning it to a lower position. Similarly, if the beam has been deflected horizontally into the plane of the paper by deflection unit 114, it cannot subsequently be deflected back out of the plane of the paper. Thus, the total number of vertical locations of medium 14 that would generally be used in a practical system is less than the theoretical maximum by an amount equal to the vertical deflection which deflection unit 110 is capable of producing. Also, the number of horizontal locations of medium 14 which would generally be utilized in a practical system is less than the theoretical maximum by the total horizontal deflection which deflection unit 114 can introduce. In the exemplary embodiment described herein, it has been assumed that deflection units 110 and 114 are each capable of introducing a maximum deflection of seven increments. This requires that a correction constant of 111 (the binary representation of the decimal digit "7") be added to adders 125 and 126. This may be accomplished in any of a variety of known manners.

In the above discussion, it was assumed that the light beam 12 enters deflection unit 110 at the lower right-hand corner thereof. However, the system could just as easily have been implemented in such a manner that the light beam 12 enters the deflection unit 110 at the upper left-hand corner thereof. In such a case, vertical deflection unit 110 would be used to deflect the light beam in a downward direction and horizontal deflection unit 114 would be used to deflect the light beam in a horizontal direction out of the plane of the drawing in FIG. 3. Assuming that deflection unit 117 is capable only of upward deflection of the light beam, and that horizontal deflection unit 118 is capable of deflecting the beam only into the plane of the drawing, then it would be necessary for adder 125 to add the contents of registers 119 and 123, and it would be necessary for adder 126 to add the contents of registers 120 and 124 in order to furnish proper signals to the drivers 127 and 128 respectively. In this case, the sum produced in each of the adders 125 and 126 would correctly indicate the additional amount of deflection required of deflection units 117 and 118, respectively, and no correction constant will need to be added. If the light beam 12 enters deflection unit 110 at the upper right-hand corner thereof, then adder 125 would have to add the contents of registers 119 and 123, and adder 126 would have to subtract the contents of register 120 from register 124; if the beam 12 entered deflection unit 110 from the lower left-hand corner thereof, then adder 125 would have to subtract the contents of register 119 from the contents of register 123, and adder 126 would have to add the contents of register 120 to the contents of register 124. If an adder is required to perform a subtraction operation, a correction constant as defined above must also be added. If an addition operation is performed, no correction constant is necessary.

An example of the operation of this invention will now be given. In this example, it will be assumed that deflection units 110 and 114 of FIG. 3 are each capable of producing a maximum deflection of seven increments. Deflection unit 110 can deflect the light beam vertically upward, and deflection unit 114 can deflect the light beam horizontally into the plane of the drawing. It is further assumed that deflection units 117 and 118 are each capable of producing a maximum deflection of 127 increments. Deflection unit 117 can deflect a light beam vertically upwards, and deflection unit 118 can deflect a light beam horizontally into the plane of the drawing. Thus, for reasons described above, a character-shaped beam of light can be made to impinge upon the medium 14 at any location on a grid that is 121 units wide and 121 units high. Deflection units 110, 114, 117 and 118 implemented in accordance with the above parameters are shown in more detail in FIGS. 4, 5, 6 and 7, respectively. For example, assume that the character to be selected is located at a position on the character mask 13 such that seven increments of vertical deflection and seven increments of horizontal deflection are required in order that a beam of light pass through the selected character. Assume further that the selected character is to be projected upon a location on the medium 14 that is displaced from the lower right-hand portion thereof 103 vertical increments and 40 horizontal increments.

In order to set the controls of the system to cause the incoming light beam 12 to be deflected through the selected character on the mask 13, the binary number 111 (equivalent to the decimal number "7") will be set into each of the character selection registers 119 and 120. The binary number 1100111 (equal to the decimal number "103") will be set into the vertical image deflection register 123, and the binary number 0101000 (equal to the decimal number "40") will be set into the horizontal image deflection register 124. As shown in FIG. 4, the contents of register 119 will be fed to vertical driver 121 to control the setting of switches 36, 37 and 38 to produce seven increments of vertical deflection in the first vertical deflection unit 110. As shown in FIG. 5, the contents of register 120 will be utilized by horizontal driver 122 to control the setting of switches 52, 53 and 54 to produce seven increments of horizontal deflection of the light beam 12 by horizontal deflection unit 114. The light beam 12 will then pass through the selected character on the mask 13 (FIG. 3).

emerging therefrom as a character-shaped beam. The beam 12, which now carries the shape of the selected character, will then enter the vertical deflection unit 117 shown in FIG. 6. Vertical deflection unit 117 comprises seven birefringent deflection elements 130 through 136. The first deflection element 130 is of such thickness as to deflect an extraordinary ray by an amount equal to one increment of deflection. Each successive deflection element 131, 132, 133, 134, 135, 136 is twice the thickness of the preceding deflection element. Thus, the deflection unit 117 is capable of introducing any amount of deflection from 0—127 deflection increments. In front of each deflection element is an electro-optic device 137 through 143 across each of which an electric potential may be applied by closing an associated switch 144 through 150.

In order to generate the amount of beam deflection that must be added by deflection unit 117, the contents of vertical character selection register 119 is subtracted from the contents of vertical image deflection register 123 by adder 125. The medium 14 (FIG. 3) is aligned with respect to vertical deflection unit 117 in such a manner that the character-shaped beam of light 12 must be deflected vertically upward seven increments (and horizontally into the plane of the drawing seven increments) in order for the beam to be projected upon the lower right-hand corner of the grid. The binary number 111, contained in a register 151 is therefore also added by adder 125 to produce the result which is stored in an adder output register 152. Register 152 then furnishes a proper input to vertical driver 127 which will control the setting of switches 144 through 150 so that deflection unit 117 will produce the desired additional vertical deflection of the character-shaped beam 12. After the character-shaped beam leaves deflection element 136, it will enter the horizontal deflection unit 118 shown in FIG. 7. Deflection unit 118 also contains seven birefringent deflection elements 153 through 159, seven electro-optic devices 160 through 166, and seven switches 167 through 173. Adder 126 will subtract the contents of horizontal character selection register 120 from the contents of the horizontal image deflection register 124, and will add the correction factor contained in register 174 to produce an output which indicates the total amount of deflection which must be added to the character-shaped light beam 12 by deflection unit 118. This result will be stored in the adder output register 175, the output of which is fed to horizontal driver 128 which controls the setting of switches 167 through 173 so that the horizontal deflection unit 118 will add the proper number of deflection increments to the character-shaped beam 12. After the beam 12 leaves deflection element 159, it will impinge upon the display or light sensitive medium 14 (FIG. 3) at the desired location.

As was mentioned above, various elements shown in these drawings could be contained in a device (such as a computer) which controls the optical system. In addition to the elements previously mentioned, it will be clear to those skilled in the art that the correction registers 151 (FIG. 6) and 174 (FIG. 7) could also be included in a controlling device. Also, the adders 125 and 126 could be designed in such a manner that they automatically add any necessary correction constant. In such a case, registers 151 and 174 would not be needed. Of course the adder output registers 152 and 175 could also be contained in the controlling device. Additionally, various implementations of the drivers 121, 122, 127 and 128 could be used. Each of the drivers could contain decoding means which would convert an input representative of the number of deflection increments needed to an output which is directly indicative of which switches must be closed in order to accomplish the desired deflection. If the optical unit is controlled by a computer or data processing machine, then the capabilites of the controlling device could be utilized to convert deflection information into switch-setting information. For example, such a controlling device could convert the deflection information into a pattern of binary ones and zeros which are directly indicative of the switch settings required for the desired deflection. In such a case, the drivers could be relatively simple electronic devices which control the various switches.

While the invention has been particularly shown and described with reference to preferred embodiments thereof, it will be understood by those skilled in the art that various changes in form and details may be made therein without departing from the spirit and scope of the invention.

I claim:
1. An electro-optic printer comprising, in combination:
   means for providing a beam of collimated, plane polarized light;
   means for forming said beam, at a selected point, into a character-shaped beam having the shape of any desired character;
   first position indicating means for indicating the point at which said selected character has been formed;
   a sheet of light sensitive material;
   second position indicating means for indicating a selected position on the surface of said light sensitive material; and
   directing means responsive jointly to said first position indicating means and said second position indicating means for directing said character-shaped light beam to said selected position on the surface of said light sensitive material.
2. The apparatus of claim 1 wherein:
   said first position indicating means comprises means for manifesting a digital signal representative of the displacement of said character-shaped beam from a predetermined zero position; and
   said second position indicating means comprises means for manifesting a digital signal representative of the displacement of said selected position on the surface of said light sensitive material from a predetermined zero position.
3. The apparatus of claim 2 wherein:
   said directing means includes adding means for adding the digital signal contained in said first position indicating means to the digital signal contained in said second position indicating means.
4. The apparatus of claim 2 wherein:
   said directing means includes substracting means for subtracting the numerical quantity represented by the digital signal in said first position indicating means from the numerical quantity represented by the digital signal contained in said second position indicating means to obtain a digital signal representing a resultant quantity.
5. The apparatus of claim 4 wherein:
   said directing means also contains means for adding a predetermined constant to said resultant quantity.
6. An electro-optic printer comprising, in combination:
   a mask having transparent portions in the form of characters to be printed;
   means for producing a beam of linearly polarized light;
   first position indicating means for manifesting a digital signal representative of the position on said mask of a selected character;
   first deflecting means responsive to said first position indicating means for deflecting said beam of light to said location of said selected character, whereby a character-shaped beam of light is passed through said mask in the shape of said selected character;
   a sheet of light sensitive material;
   second position indicating means for manifesting a digital signal representative of the position of a selected location on said light sensitive material;
   deflection control means responsive jointly to the digital signals contained in said first position indicating means and said second position indicating means to produce a resultant deflection signal; and
   second deflecting means responsive to said deflection control means for deflecting said character-shaped beam to said selected location on said light sensitive material.
7. The apparatus of claim 6 wherein:
   said deflection control means comprises a digital adder.
8. The apparatus of claim 7 wherein:

said deflection control means further comprises means for adding a predetermined correction constant to said resultant deflection signal.

9. An electro-optic printer comprising, in combination:

a mask having portions in the form of characters to be printed;

means for producing a beam of linearly polarized light;

first horizontal position indicating means for manifesting a first digital signal representative of the horizontal displacement of a selected character on said mask from a predetermined zero position on said mask;

first vertical position indicating means for manifesting a second digital signal representative of the vertical displacement of said selected character from said zero position on said mask;

first horizontal deflecting means responsive to said first digital signal to horizontally deflect said beam of light by an amount equal to said horizontal displacement;

first vertical deflecting means responsive to said second digital signal to vertically deflect said beam of light by an amount equal to said vertical displacement;

said beam of light, after deflection by said first horizontal and vertical deflecting means, being formed by said mask into a character-shaped beam carrying the shape of said selected character;

a light sensitive medium having on its surface a selected location upon which it is desired that said character-shaped beam shall impinge;

second horizontal position indicating means for manifesting a third digital signal representative of the horizontal displacement of said selected location from a predetermined zero location on said medium;

first adding means for combining said first and third digital signals to produce a resultant horizontal deflection signal; and second horizontal deflecting means responsive to said resultant horizontal deflection signal to horizontally deflect said character-shaped beam to a location that is horizontally displaced from said zero location on said medium by an amount equal to said horizontal displacement of said selected location on said medium;

whereby said character-shaped beam will be directed to a selected horizontal location on said medium.

10. The apparatus of claim 9, further including:

second vertical position indicating means for manifesting a fourth digital signal representative of the vertical displacement of said selected location from said zero location on said medium;

second adding means for combining said second and fourth digital signals to produce a resultant vertical deflection signal; and second vertical deflecting means responsive to said resultant vertical deflection signal to vertically deflect said character-shaped beam to a location that is vertically displaced from said zero location on said medium by an amount equal to said vertical displacement of said selected location on said medium;

said character-shaped beam, after deflection by said second horizontal and vertical deflecting means, being directed to said selected location on said medium.